United States Patent [19]

Ott

[11] Patent Number: 4,553,719

[45] Date of Patent: Nov. 19, 1985

[54] VEHICLE LIFTING SYSTEM AND METHOD

[76] Inventor: David Ott, 3944 W. Alabama, Suite 101, Houston, Tex. 77027

[21] Appl. No.: 717,644

[22] Filed: Apr. 1, 1985

Related U.S. Application Data

[63] Continuation-in-part of Ser. No. 548,652, Nov. 4, 1983, abandoned.

[51] Int. Cl.[4] .............................................. B64D 9/00
[52] U.S. Cl. .............................. 244/118.1; 294/67.33; 294/81.54; 294/81.52; 294/904; 244/137 A
[58] Field of Search ............ 244/137 R, 118.1, 137 A; 294/67.33, 67.31, 81.51, 81.54, 81.21, 81.52, 82 AH, 904; 187/8.43, 8.59, 8.67; 414/458–461

[56] References Cited

U.S. PATENT DOCUMENTS

| | | | |
|---|---|---|---|
| 2,284,238 | 5/1942 | Todd | 294/67 BB |
| 3,117,652 | 1/1964 | Wallace | 187/8.59 |
| 3,161,309 | 12/1964 | Baudhuin et al. | 294/67 BC |
| 3,485,151 | 12/1969 | Taylor | 244/137 A |
| 3,655,232 | 4/1972 | Martelle | 294/67 BB |
| 4,209,195 | 6/1980 | Holmes | 294/81 SF |
| 4,212,449 | 7/1980 | Tsujimura | 187/8.59 |
| 4,266,904 | 5/1981 | Fadness | 294/67 BC |

FOREIGN PATENT DOCUMENTS

| | | | |
|---|---|---|---|
| 678025 | 5/1966 | Belgium | 294/67 BB |
| 1307942 | 9/1962 | France | 294/67 BC |

OTHER PUBLICATIONS

Kerr et al., "Helicopter Technological Progress" *Vertiflight*, Jul/Aug. 1975, p. 2.

*Primary Examiner*—Galen L. Barefoot
*Attorney, Agent, or Firm*—Edmund F. Bard & Associates

[57] ABSTRACT

An improved carrying assembly is provided for using with, and controlled from, a helicopter to seize and lift immobilized vehicles from freeways and other limited access highways. The carrying assembly may be composed of an integrated and framework having four selectively adjustable vertical leg members, each horizontally positionable one to another, for seizing and supporting the vehicle at appropriate points on its chassis whereby the carrying assembly can engage vehicles of many different sizes and configurations. Control and actuation of each of the different segments of the framework is preferably achieved from within the helicopter, whereby the vehicle targeted from removal can be directly approached from overhead, and whereby the vehicle can be securely seized and lifted without assistance from personnel on the ground.

11 Claims, 13 Drawing Figures

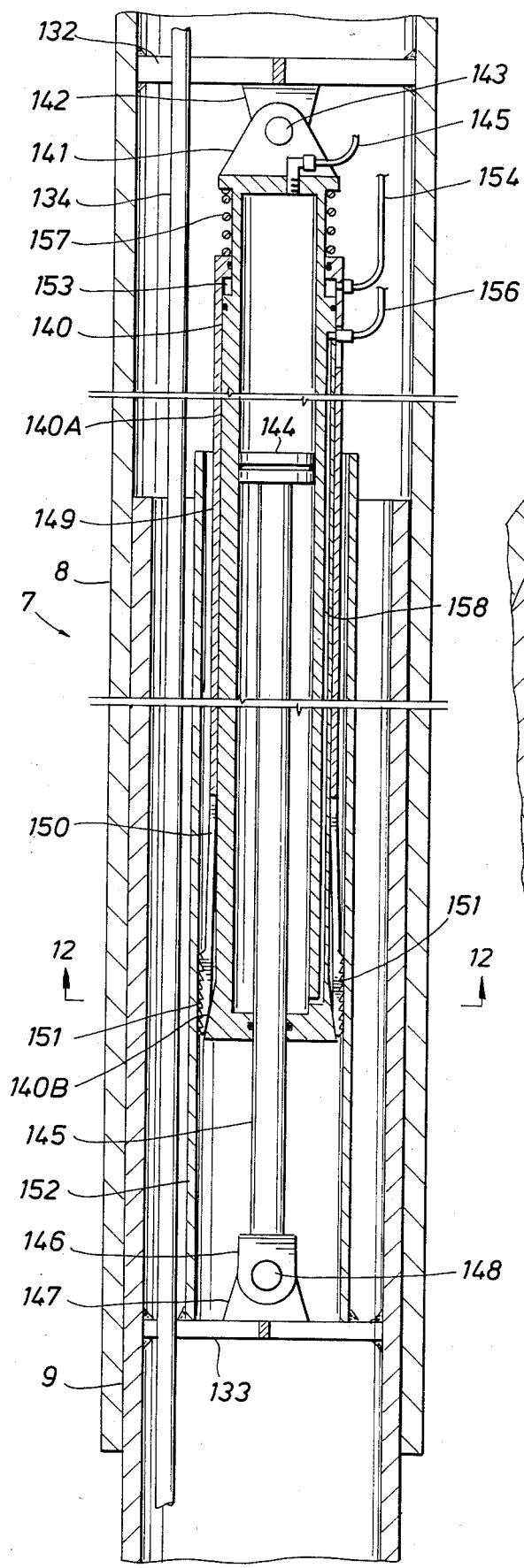
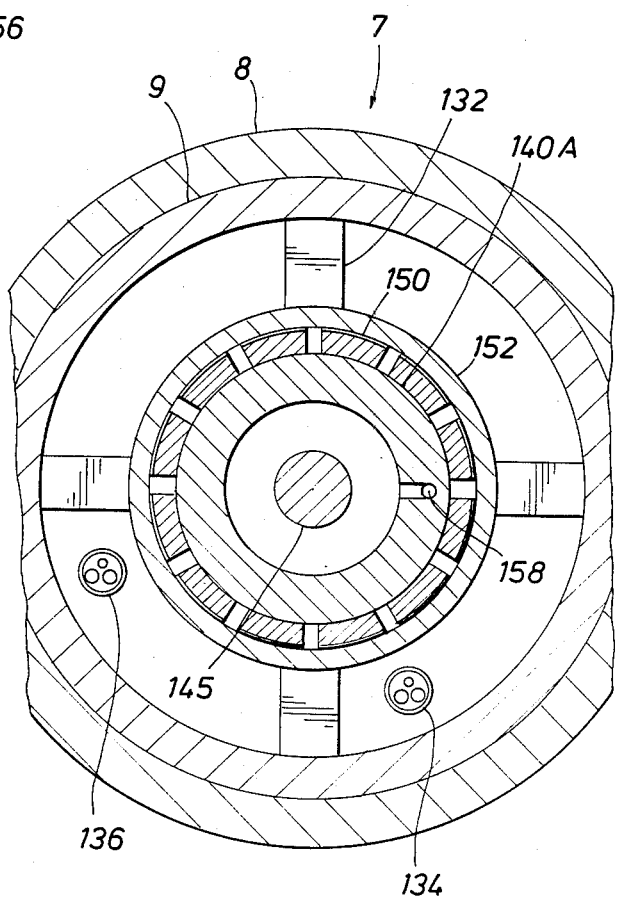
FIG.11
FIG.12

VEHICLE LIFTING SYSTEM AND METHOD

This is a continuation-in part of application Ser. No. 548,652, filed Nov. 4, 1983 now abandoned.

BACKGROUND OF INVENTION

This invention relates to improved methods and apparatus for seizing and transporting bulky and irregularly shaped objects from one location to another, and more particularly relates to methods and apparatus for seizing and removing a stalled vehicle from a limited access highway and the like.

It is well known that traffic jams occur on freeways, and that most of these traffic jams are caused by one or more vehicles becoming immobilized so as to block one or more of the lanes during peak useage periods. It is obvious that traffic cannnot be unclogged unless and until the immobilized vehicle is removed from the freeway.

It is fully recognized by the experts in traffic management that the longer a traffic jam goes uncorrected the more impassable will become that highway. This is because the number of vehicles stopped by the obstruction begins to grow until preceding exits and entrances also become a traffic jam, it is seldom that the vehicle can extricate itself. It may not be possible to prevent vehicle from ever becoming immobilized on a freeway. However, the severity and extent of the tie-up can be held to a minimum if the offending vehicle can be removed from the freeway within a minimum period of time thereafter.

At the present time, however, and given the design of most freeways and other such limited access highways, a stalled or otherwise immobilized vehicle can only be removed by a tow truck. More particularly, the tow truck must often travel a considerable distance through the traffic jam before it can even reach the stalled vehicle, and it must frequently contribute further to the jam by a need to maneuver so as to properly engage the vehicle. Thereafter, the tow truck may also have to drag the vehicle a further distance through the traffic before it can exit the freeway, and this may also contribute further to the tie-up.

It will be readily apparent that if the tow truck or its functional equivalent could reach the immobilized vehicle by a more direct route, the obstruction to traffic might be cleared before it can develop into a complete blockage of the freeway. "As the crow flies" is, in theory, the most direct of all possible routes, and therefore it has been suggested that a helicopter or the like be used to reach and remove the vehicle creating the jam.

Helicopters have long been used by military forces to deliver and remove tanks, trucks, and other cargos to and from locations far more inaccessible than traffic jams on freeways. Furthermore, military helicopters and their operating personnel habitually handle vehicles and other loads which are far heavier and clumsier than most vehicles traveling on any freeway or other limited access highway. Nevertheless, the practices and equipment which are conventionally used to releasably secure military loads to these helicopters are not suitable for the purposes of the present invention.

In particular, a military-type carrying assembly is primarily intended for transporting a cargo to a relatively inaccessible location, rather than for pick-up and removal of a cargo from such a location. Accordingly, such an assembly is designed and intended for quick release, rather than for quick pick-up, and the carrying assembly may therefore be matched to the configuration of a specific cargo. For present purposes, however, what is required is a carrying assembly which can be operated so as to quickly but securely seize and lift vehicles having various different sizes, shapes and weights, and preferably without the assistance of personnel on the ground.

Another reason why military-type carrying assemblies are not suitable for present purpose is that military vehicles and other such loads purposes are usually sufficiently rugged that they can be lifted and transported without incurring damage in the process. Even in those instances where a relatively fragile load must be handled, there is sufficient time for ground personnel to specially interconnect the load to the carrying assemble to avoid such damage. Since the load is intended for quick release at the target site, and since the carrying assembly must usually be operated from within the helicopter itself, this is inconsistent with the needs of the present invention. In the present situation, what is required is a carrying assembly which is entirely operable from within the helicopter to seize the vehicle and without assistance from anyone on the ground and to be operable from within the helicopter to accomodate vehicles or different sizes, shapes and weights.

SUMMARY OF INVENTION

In a preferred embodiment of the present invention, an improved carrying means is provided for use with a helicopter or the like, and which is basically composed of two pairs of vertically suspended L-shaped arms for reaching under and engaging the vehical at four appropriate locations on its chassis. Each of these four L-shaped arms are composed of telescopically interconnected sections whereby these arms may be vertically extended or retracted either together or singly, depending upon the shape and size of the particular vehicle sought to be engaged and lifted. Furthermore, each of the horizontally-directed leg portion, or each L-shaped arm member, is also preferably adapted to be swiveled acurately and horizontally on the lower end of its vertical portion, and is further preferably adapted to be extended or retracted horizontally to or from such lower end of the L-shaped arm member.

Referring again to the carrying assembly as a whole, the assembly further includes a pair of telescopically or segmentally formed cross members, each adapted and arranged to span the width of the targeted vehicle, and each interconnected at both ends to the upper end of one of the four L-shaped arm members. These two cross members, in turn, are linked together by two spaced-apart longitudinal members which are formed of telescopically or sequentially interconnected sections, whereby each of the two L-shaped arm members forming a pair of may be selectively separated or moved together according to the particular width of the targeted vehicle, and whereby each of the two pairs of L-shaped members may be moved apart or together to accommodate the particular length of the targeted vehicle.

The overall carrying assembly is preferably suspended from the helicopter by four vertical support members, two of which are fixedly secured to one of the cross members at spaced-apart locations therealong, and the other two being similarly attached to the other cross member. The four support members, in turn, are slidably or rollably interconnected with the bar-like skid members of the helicopter, whereby extension or retraction of the longitudinal members can be achieved without the need to disconnect the carrying assembly from the helicopter.

As will hereinafter be explained in detail, each of the various adjustable sections of the L-shaped arms, cross members, longitudinal members, and other segmentally formed portions of the carrying assembly, are preferably formed in the manner of hydraulically actuated cylinder-and-piston components. More particularly, these various components are preferably interconnected whereby they are may be selectively operated and controlled from within the helicopter, and whereby the entire carrying assembly can be adjusted from within the helicopter to accommodate vehicles of different sizes, shapes and weights.

In one particularly suitable arrangement, each of these components can be selectively adjusted according to the circumstances as encountered. In another suitable arrangement, a control system may be included which is selectively pre-programmed according to predetermined dimensions and specification according to different types of vehicles, and wherein all that is required to operate the system is to identify the targeted vehicle of immediate interest.

Accordingly, it is a feature of the present invention to provide improved methods and apparatus for seizing and lifting vehicles off of freeways and other types of limited access highways and the like.

It is another feature of the present invention to provide improved methods and apparatus for employing a helicopter and the like to approach, seize and to lift and remove an immobilized vehicle from a freeway and the like.

It is a further feature of the present invention to provide improved methods and apparatus which can be operated substantially entirely from within a helicopter to seize and lift vehicles of different sizes and configurations from inaccessible locations along a freeway of the like.

It is a further feature of the present invention to provide an apparatus for seizing and lifting a motor vehicle and the like, comprising a first plurality of spaced-apart extensible frame members, a second plurality of space-apart extensible frame members each interconnected across adjacent ends of said first frame members, a plurality of first suspension members each interconnected at one end to a selected one of said second plurality of frame members and adapted at the other end to movably interconnect with the skid of a helicopter and the like, and a plurality of second suspension members each interconnected with and selectively extensible from one of the ends of said second plurality of frame members to and about a portion of said vehicle.

These and other features and advantages of the present invention will become apparent from the following detailed description, wherein reference is made to the figures in the accompanying drawings.

IN THE DRAWINGS

FIG. 11 is a simplified pictorial representation, partly in cross section, of another different portion of the apparatus depicted generally in FIG. 1.

FIG. 12 is a simplified cross sectional representation of a portion of the apparatus depicted in FIG. 11.

DETAILED DESCRIPTION

Figure 1:
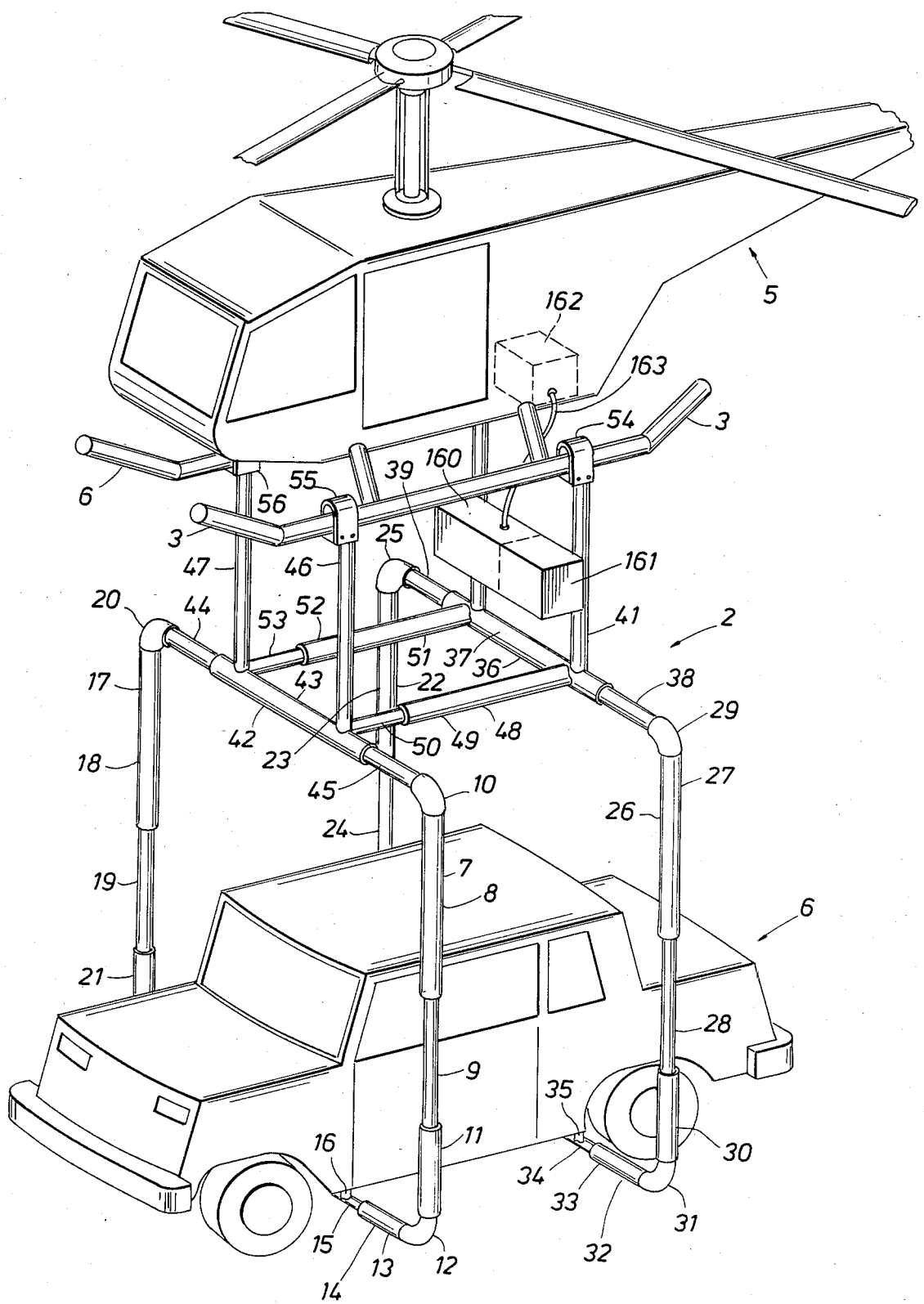
FIG. 1 is a simplified pictorial representation of one embodiment of the present invention, and depicting the overall configuration of a carrying assembly suspended from a helicopter for seizing a typical motor vehicle.

Referring now to FIG. 1, there may be seen a simplified pictorial representation of a carrying assembly 2 embodying the concept of the invention and interconnected with the skids 3 and 4 of a suitable helicopter 5 for seizing and lifting a typical motor vehicle 6. More particularly, the carrying assembly 2 may be seen to be composed of a pair of vertical support members 7 and 17 arranged to extend downwardly about the forward end of the vehicle 6, and another pair of similar vertical support members 22 and 26 similarly arranged to extend downwardly on opposite sides of the rearward portion of the vehicle 6. Referring in particular to the vertical support member 7, it may be seen that this component includes an outer sleeve member 8 interconnected at its upper end with and L-section 10, and at its lower end with an inner sleeve member 9 slidable disposed therein for retraction or extension out of the lower end of the outer sleeve member 8 as will hereinafter be described in detail. In addition, the lower end of the inner sleeve member 9 may be seen to be interconnected with a rotating section 11 which, in turn, is fixedly interconnected with another L-section 12 similar in configuration to the aforementioned L-section 10.

As hereinbefore noted, it is desirable that the carrying assembly 2 be adjustable to seize and securely engage vehicles of different sizes and dimensions, and that the sections of the carrying assembly 2 therefore be selectively controlled from within the helicopter 5. The different components of the carrying assembly 2 may, of course, be actuable in response to any suitable type of power, but it is deemed that it is preferable for such components to be responsive to hydraulic power. Accordingly, the carrying assembly 2 will preferably include a suitable hydraulic reservoir 160 and pump 161 and that a suitable control unit 162 be located in the helicopter 5 and electrically interconnected by a suitable cable 163 with the various hydraulically actuated components of the carrying assembly 2.

Referring more particularly to the carrying assembly 2, it should be noted that the purpose of the vertical support member 7 is to extend down along one side of the vehicle 6 at a distance appropriate to the particular height of the vehicle 6. Accordingly, this requires that the vehicle support member 7 be adjustable in length, in response to appropriate signals from the control unit 162, according to the requirements of the particular vehicle 6 sought to be seized and lifted. Accordingly, the purpose and function of the outer sleeve 8 is to extend or retract the inner sleeve section 9 a distance as may be required.

Referring again to FIG. 1, it may be seen that the L-section 12 is interconnected at its opposite end to a horizontal support member 13 which, in turn, is composed of an outer sleeve mechanism 14 and an inner sleeve mechanism 15 slidable disposed in the free end of the outer sleeve mechanism 14. In addition, the inner sleeve mechanism 15 is further provided with a jack assembly 16 for engaging the chassis of the motor vehicle 6 at an appropriate location therealong. Accordingly, it will be apparent that the function of the rotating section 11 is to revolve the horizontal support member 13 accurately to a direction pointed towards either the forward or rearward end of the vehicle 6, while the helicopter 5 is hovering over the vehicle 6. After the helicopter 5 has attained the appropriate position above the vehicle 6, and after the vertical support member 7 has been properly aligned along and extended down a sufficient distance, the rotating section 11 is actuated to accurately swing the horizontal support member 13 under the vehicle 6 whereby the jack assembly 16 may appropriately engage the chassis of the vehicle 6. It will further be apparent that, although the rotating mechanism 11 functions to swing the jack assembly 16 in and out from under the vehicle 6, the horizontal support member 13 functions to locate the jack assemble 16 exactly under the chassis of the vehicle 6 at the appropriate location therein.

Although not completely visible in FIG. 1, it will be apparent that the other forward vertical support member 17 is composed of similar components and operates in a similar manner relative to the vehicle 6. In particular, the vertical support member 17 may be seen to be interconnected with an appropriate L-section member 20 at its upper end, and to be further composed of an outer sleeve member 18 slidably interconnected with an inner sleeve member 19 which, in turn, is fixedly attached at its lower end to a rotating section 21 similar in configuration and purpose to the rotating section 11 hereinbefore described.

Similarly, the rearward vertical support member 22 is interconnected at its upper end to an L-section member 25, and is composed of an outer sleeve member 23 slidably interconnected at its lower end with an inner sleeve 24. Similarly, its companion vertical support member 26 is interconnected at its upper end to a similar L-section member 29, and is composed of an outer sleeve member 27 slidably interconnected at its lower end with a similar inner sleeve member 28 having its lower end, in turn, fixedly interconnected with a rotating section 20 similar in configuration and function to the rotating section 11 hereinbefore described. Further, the rotating section 30 is interconnected fixedly at its lower end to a similar L-section 31 which, in turn, is interconnected with a horizontal support member 32 composed of an outer sleeve member 33 slidably interconnected with an inner sleeve member 34 carrying a jack assembly 35 similar in function and purpose to the jack assembly 16 hereinbefore described.

Although the four vertical support members 7, 17, 22, and 26 are adapted to be extended or retracted along the opposite sides of the vehicle 6, it will be further apparent that it will also be necessary to move corresponding pairs of these vertical support members together or apart according to the dimensions of a particular vehicle 6. Accordingly, the carrying assembly 2 is preferably provided with a cross member 42 composed of an outer sleeve section slidably interconnected at its ends with inner sleeve members 44 and 45 which, in turn, are respectively interconnected at their opposite ends with L-sections 10 and 20 respectively.

Similarly, vertical support members 22 and 26 may be moved apart, or drawn together, by means of a cross member 36 composed of an outer sleeve 36 slidably interconnected at its ends with inner sleeve members 38 and 39. It wil be further seen that inner sleeve member 38 is itself fixedly interconnected with L-section 29, and that inner sleeve member 39 is interconnected with L-section 25. Accordingly, actuation of outer sleeve 37 will effectively extend or retract inner sleeve member 38 and 39 to spread or contract vertical support members 22 and 26 about the rearward end of the vehicle 6.

Referring again to the apparatus generally represented in FIG. 1, it will be readily apparent that the helicopter 5 must carry the vehicle 6 in a manner whereby the vehicle 6 is effectively supported relative to its center of gravity. More particularly, the vehicle 6 must be seized by the forward and rearward pairs of vertical support members on equal sides of its center of gravity. To effectuate this, it is often convenient to retract or extend the distance between vertical support members 22 and 26, and this may be achieved by means of longitudinal members 48 and 51 which extend in spaced apart relationship between cross members 36 and 42.

More particularly, it will be seen in FIG. 1 that cross member 48 is basically composed of an outer sleeve 37 of cross member 36, and having its other end slidably interconnected with inner sleeve 50 which, in turn, is fixedly interconnected with outer sleeve 43 of cross member 42. Similarly, longitunal member 51 is basically composed of an outer sleeve member 52 having one end fixedly interconnected with outer sleeve member 37 of cross member 36, and having its other end slidably interconnected with inner sleeve member 53 which, in turn, is also fixedly interconnected with outer sleeve 43 of cross member 42.

Referring again to FIG. 1, it may be seen that the overall carrying assembly 2 further includes a rear pair of rigid members 40 and 41 vertically mounted on the top of outer sleeve member 37 for suspension from the rearward ends of skids 3 and 4 of the helicopter 5. Similarly, rigid members 46 and 47 are vertically mounted on outer sleeve member 43 for suspension from the forward ends of skids 3 and 4 of the helicopter, whereby the carrying assembly 2 may be suspended from the helicopter 5 in a manner appropriate to seize and lift the motor vehicle 6.

Figure 8:
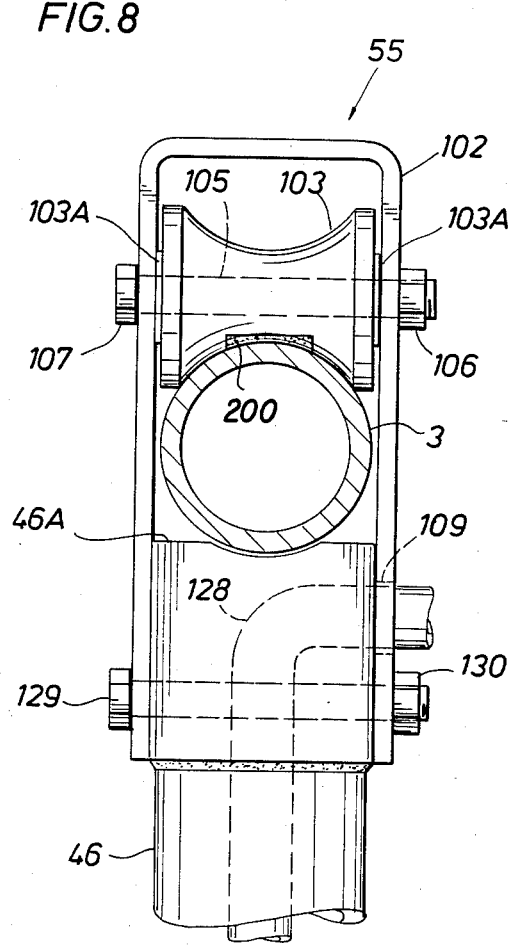
FIG. 8 is a simplified pictorial representation, partly in cross section, of a further different portion of the apparatus depicted in FIG. 1.
Figure 9:
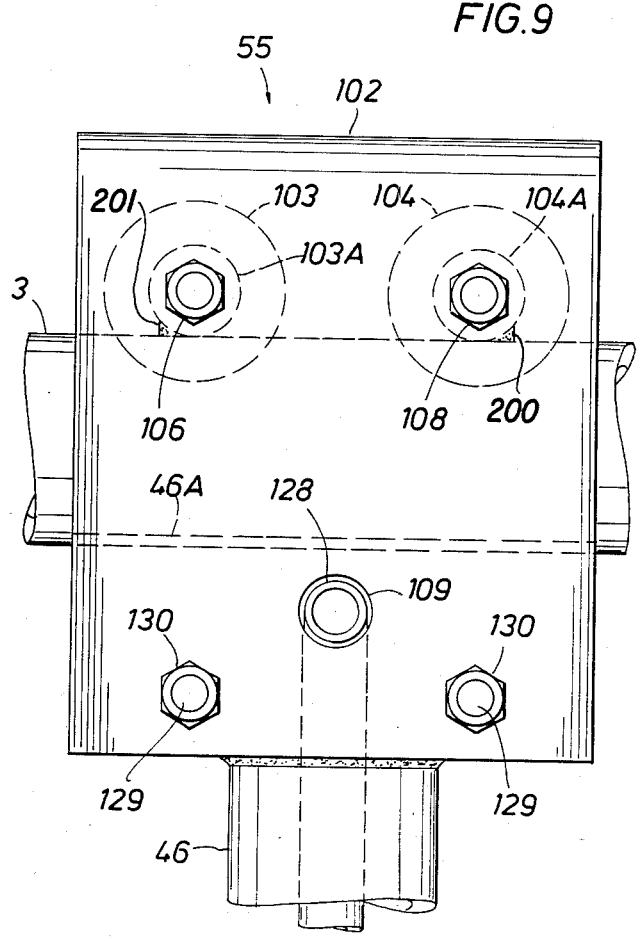
FIG. 9 is a simplified pictorial representation, partly in phantom, of another different view of the apparatus depicted in FIG. 8.

Inasmuch as it may be desirable to extend or retract the spacing between vertical support members 7 and 17 to and from vertical support members 22 and 26, respectively, it will be apparent that the corresponding distance between rigid members 46 and 47 and rigid members 40 and 41 must also be adjusted according to the configuration of a particular vehicle said to be seized and lifted. Accordingly, rigid members 41 and 46 are desirably suspended from skid 3 by means of hanger assemblies 54 and 55, respectively, and rigid members 47 and 40 are similarly suspended from skid 4 by hanger 56 and another similar component not specifically depicted in FIG. 1. More particularly, hangers 54–56 (and the other hanger not depicted) are preferably arranged on the skids 3 and 6 in such a fashion as to remain stationary thereon as by means of fillet welds 200 and 201 placed on skid 3 for example, as seen in FIGS. 8 and 9, with such welds preventing the movement of rollers 103 and 104 along skid 3. The curvature of rollers 103 and 104 is merely for the purpose of forming a matching complementary surface for tubular skid 3. However if welds 200 and 201 were eliminated, a brake mechanism would be required to maintain hangers 54–56 in one position on the skid 3. Release of the brake would allow the assembly 2 to be capable of being selectively adjusted along skids 3 and 6 should this be necessary.

Figure 2:
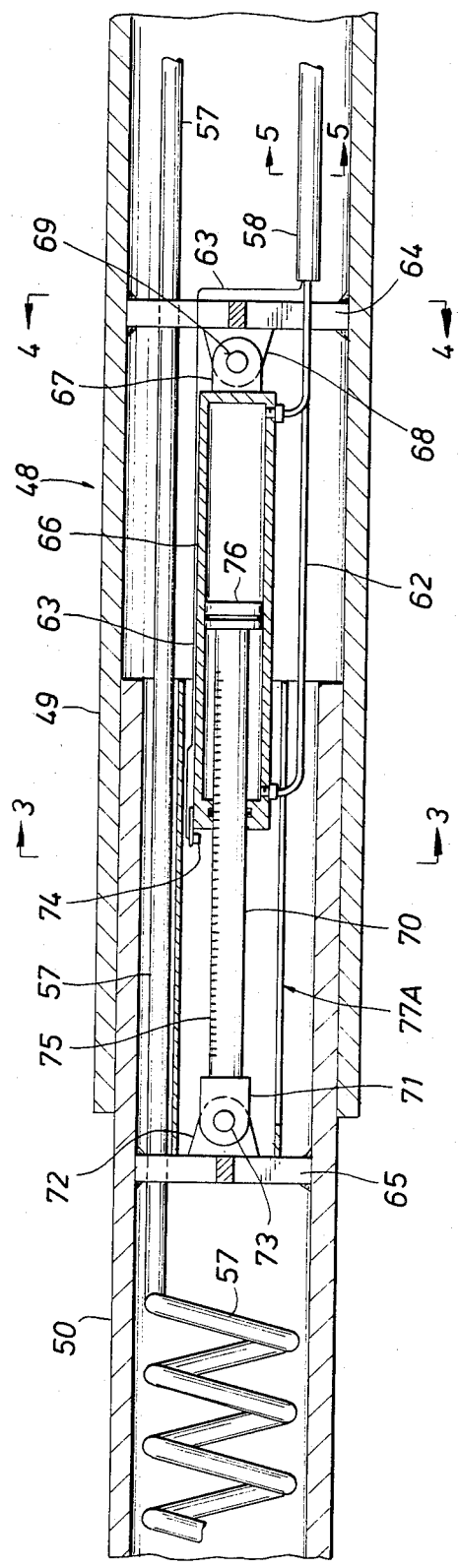
FIG. 2 is a simplified pictorial representation, partly in cross section, or an exemplary segmented portion of the apparatus depicted in FIG. 1.

Referring now to FIG. 2, there may be seen a simplified pictorial representation, partly in cross section, of a portion of longitudinal member 48. More particularly, it may be seen that longitudinal member 48 is composed of outer sleeve member 49 which is slidably engaged at one end with the confronting end of inner sleeve member 50, that outer sleeve member 49 preferably includes a suitable mounting bracket or spider 64 fixedly located at an appropriate location therein, and that inner sleeve member 50 similarly includes a spider 65 suitably positioned therein at an appropriate location. Referring again to outer sleeve 49, it may be seen enclosed a hydraulic cylinder 66 having an eye member 67 fixedly mounted on its base end and interconnected by a pin 69 to a clevis bracket 68 mounted on the spider 64. In addition, a conduit 58 may be seen to contain a pair of hydraulic lines 61 and 62, and an electrical lead 63. The hydraulic line 61 is interconnected to the cylinder 66 adjacent its base end for supplying hydraulic pressure to drive piston 76 and rod 70 to an extended position, and line 62 is interconnected at the forward end of the cylinder 66 for returning piston 76 and rod 70 to a retracted position within the cylinder 66. The rod 70 is preferably interconnected with a clevis member 71 which, in turn, is interconnected by pin 73 to an eye member 72 fixedly mounted on the spider 65 fixed within the inner sleeve 50. Accordingly, extension of the piston 76 and rod 70, by application of pressure from hydraulic line 61, will result in extending the inner sleeve 50 outwardly from the outer sleeve 49. On the other hand, if hydraulic pressure is applied to the cylinder 66 through hydraulic line 62, and if hydraulic line 61 is interconnected to function as the "return" for the cylinder 66, pressure on the opposite side of piston 76 will effectuate retraction of the rod 70 and accordingly the inner sleeve 50, within the cylinder 66 and the outer sleeve 49, respectively.

As will hereinafter be apparent, it will often be necessary to communicate both hydraulic pressure and electrical control signals through the interior of the longitudinal member 48, (and other similar components) in order to supply such pressure and signals to other components such as the vertical support member 7, the rotating section 11, and the horizontal support member 13. Accordingly, it may be seen in FIG. 2 that the interior of the longitudinal member 48 may also provide a conduit or path for conduit 57, as well as conduit 58, and perhaps also for other conduits not specifically depicted therein. Furthermore, inasmuch as extention or retraction of the inner sleeve 50 relative to the outer sleeve 49 may effectively lengthen or shorten the path, it will be noted that conduit 57 not only extends through the legs of the spiders 64 and 65, but is also preferably disposed in a coiled configuration within the further portion of the inner sleeve 50, whereby the conduit 57 and other similar components may accomodate to such extension or retraction of the path.

Referring again to FIG. 2, it will be noted that inner sleeve 50 also contains a tubular shield 77 which is open at its rightward end to permit it to be moved back and forth about the cylinder 66 as the piston 76 is retracted or extended therefrom, but is fixedly attached to the spider 65. In this manner, the tubular shield 77 effectively protects the conduit 57 (and other conduits not specifically depicted therein) from damage due to movement of the piston 76 and rod 70 within the assembly.

As hereinbefore stated, it is intended piston 76 and rod 70 be extended preselected distances from within the cylinder 66, in order to establish the appropriate spacings between the forward pair of vertical support members 77 and 17 and the rearward pair of vertical support members 22 and 26. Since this must be accomplished from within the helicopter 5, in order to best achieve the purposes of the present invention, it is desirable to provide and indication of exactly how far the rod 70 has been extended from within the cylinder 66. In the apparatus depicted in FIGS. 1 and 2, this may be achieved by providing index marks 75 such as predetermined indications of magnetic, radioactive, or even luminescent paint along the length of the rod 70, and by also providing a suitable sensor 74 to respond to such markings 75 as the rod 70 moves longitudinally of the cylinder 66. Accordingly, the electrical lead 63 may, if desired, be a plurality of connectors carrying appropriate power to the sensor 74, and also carrying electrical responses to the markings 75 to an appropriate control center as will hereinafter be explained.

Figure 3:
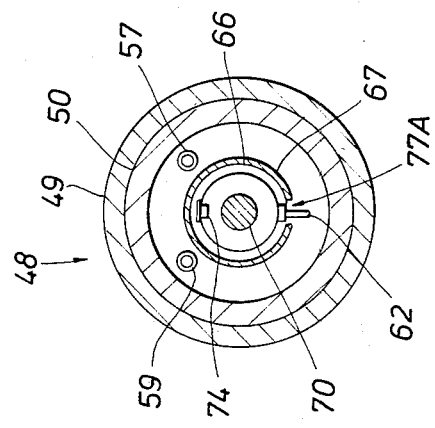
FIG. 3 is a simplified cross sectional representation of a particular portion of the apparatus depicted in FIG. 2.

Referring now to FIG. 3, there may be seen a simplified cross sectional representation of a portion of the longitudinal member 48 depicted in FIG. 2, and more particularly showing how the cylinder 66 and rod 70 is centrally positioned within the inner sleeve 50 which, in turn, is slidably disposed within the outer sleeve 49. More particularly, it may be seen that the hydraulic line 62 preferably interconnects with the forward end of the cylinder 66 through a slot 77A in the lower portion of the tubular shield 77. Furthermore, it may also be seen that, in addition to conduit 57, there may be also included another conduit 59 of equal function and configuration extending longitudinally through the interior of inner sleeve 50 to reach some other component.

Figure 4:
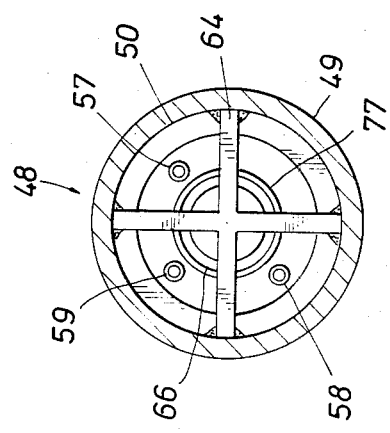
FIG. 4 is a simplified cross sectional representation of another different portion of the apparatus depicted in FIG. 2.

Referring now to FIG. 4, there may be seen another simplified cross sectional representation of a different portion of the longitudinal member 48, and also depicting the spider 64 mounted within the interior of the outer sleeve 49 which, downstream of the outer sleeve 49 slidably contains the inner sleeve 50. It may be further seen that conduits 57 and 49 extend through the spider 64 to reach through and beyond the other spider 65 in the inner sleeve 50, and that conduit 58 extends through spider 64 to reach the cylinder 60 anchored thereto.

Figure 5:
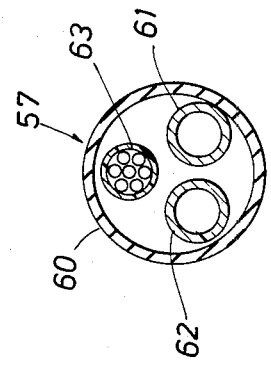
FIG. 5 is a simplified cross sectional representation of a further different portion of the apparatus depicted in FIG. 2.

Referring now to FIG. 5, there may be seen a simplified pictorial representation of conduit 57, in cross section, whereby conduit 57 may be seen to be composed of a suitable tube 60 containing not only hydraulic lines 61 and 62, but also the electrical lead 63 which extends to the sensor 74 depicted in FIG. 2. As indicated in FIG. 5, the electrical lead 63 may, if desired, be composed of a cluster of individually insulated electrical conductors for separately and individually carrying either power to the sensor 74, or for carrying electrical impulses representing indications derived by the sensor 74.

Figures 6, 7:
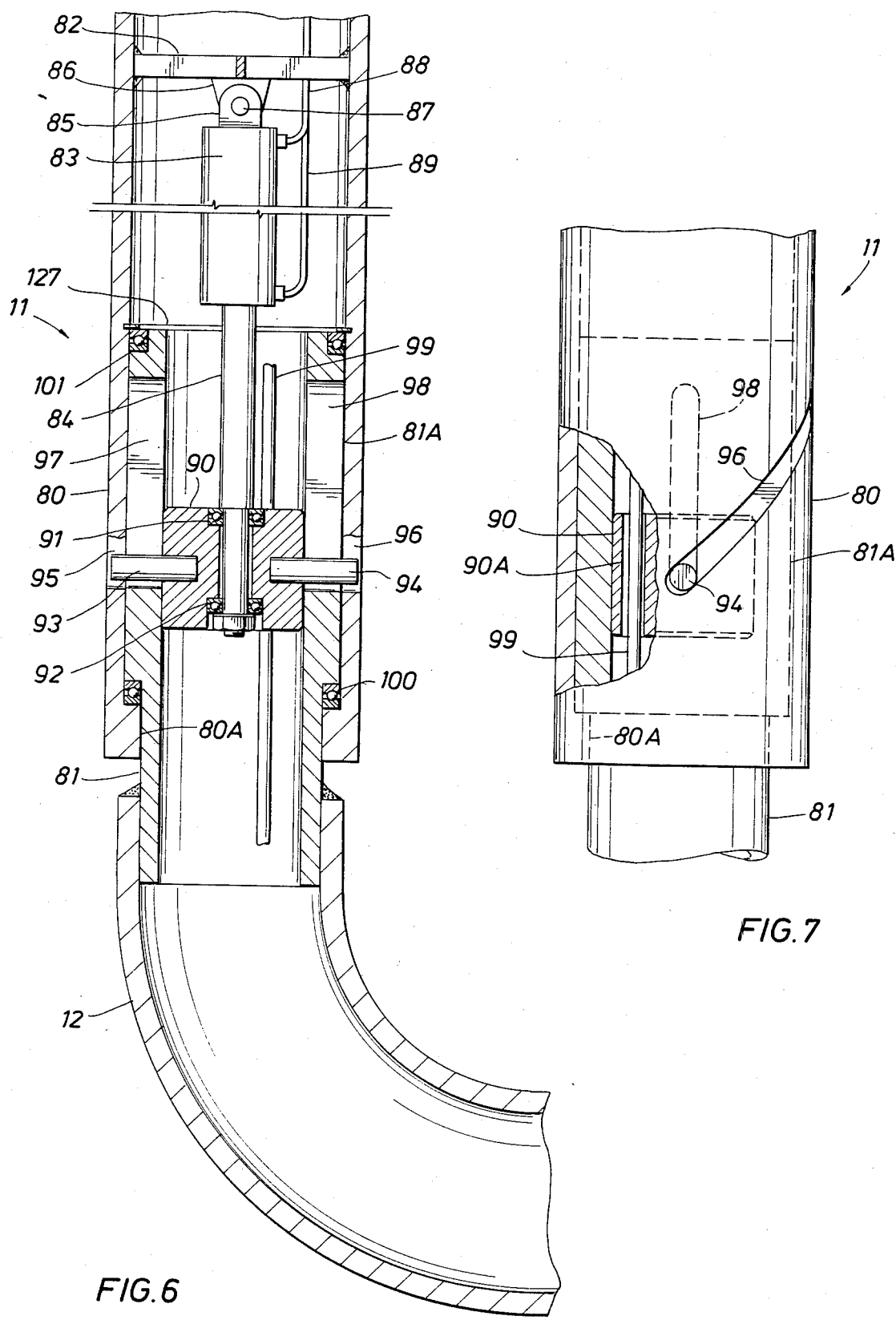
FIG. 6 is a simplified pictorial representation, partly in cross section, of another different exemplary segmented portion of the apparatus depicted in FIG. 1.
FIG. 7 is a different pictorial view, partly in cross section, of the apparatus depicted in FIG. 6.

Referring now to FIGS. 6 and 7, there may be seen a simplified pictorial representation, partly in cross section, of the details of the rotating section 11 previously discussed in FIG. 1. More particularly, the rotating section 11 may be seen to be composed of an outer sleeve 80 which is fixedly interconnected at its upper end to the inner sleeve 9 of the vertical support member 11, and which is slidably interconnected at its lower end to an inner sleeve 81 having its lower end, respectively, interconnected with the L-section 12 as hereinbefore described. More particularly, it may be seen that the outer sleeve 80 is provided with a thicker shoulder portion 80A at its lower end, and that the inner sleeve 81 is provided with a thicker shoulder portion 81A at its upper end, respectively, and that a bearing assembly 100 is interposed therebetween to provide for frictionless rotation of the inner sleeve 81 relative to the outer sleeve 80. In addition, rotation of the inner sleeve 81 within the outer sleeve 80 may further be improved by including another bearing assembly 101 held in place by a snap ring 127 or the like.

Referring again to FIGS. 6 and 7, it may be seen that the outer sleeve 80 is provided with a spider 82 or other suitable bracket fixedly mounted within its upper end and supporting and odd bracket 86. In addition, a suitable hydraulic cylinder 83 is longitudinally positioned within the outer sleeve 80, and is provided with a clevis bracket 85 interconnected with the eye bracket 86 by means of a suitable pin 87. The hydraulic cylinder 83 is suitably actuated by hydraulic power delivered thereto through hydraulic lines 88 and 89, and a suitable piston rod 84 is provided with an appropriate plunger member 90 rotatably mounted on the piston rod 84 by means of bearing assemblies 81 and 92.

As hereinbefore explained, the purpose of the rotating section 11 is to angularly revolve the L-section 12 in a plan perpendicular to the vertical support member 7. Accordingly, the plunger member 90 is preferable provided with a pair of oppositely extending pin members 93 and 94 arranged to extend through a pair of vertical slots 97 and 98 in the upper portion 81A of the inner sleeve 81, and at least partially into a pair of spirally slots 95 and 96 in the upper thinner portion of the outer sleeve 80. Accordingly, when the piston rod 84 is retracted within the hydraulic cylinder 83, the configuration of the spiraling slots 95 and 96 will guide the inner sleeve 81 in a revolving arcuate manner for the purpose hereinbefore explained. Alternatively, if the piston rod 84 is extended, the L-section 12 will be swiveled about to its previous position relative to the vertical support member 7. The hydraulic cylinder 83 is, of course, fixedly positioned within the outer sleeve 80 by being interconnected with the spider 82 as hereinbefore described. Since it is undesirable to rotate the piston rod 84 relative to the hydraulic cylinder 83, this is why bearings 91 and 92 are provided for permitting the plunger member 90 to rotate about the end of the piston rod 84 as determined by the positions of pins 93 and 94 within the slots 95 and 96. Note also that another conduit 99 may extend through the rotating section 11 in order to deliver hydraulic and electric power to components within either the horizontal support member 13, or the jack assembly 16 as hereinbefore explained. Accordingly, the plunger member 90 is preferably provided with a passageway 90A whereby the conduit 99 may pass entirely through the rotating section 11 in order to reach and service these other components.

Referring now to FIGS. 8 and 9, respectively, there may be seen a simplified pictorial representation, partly in cross section, of the basic details of the hanger assembly 55 previously mentioned in FIG. 1, and more particularly comprising a U-bracket 102 for supporting a pair of rollers 103 and 104 for riding on the upper surface of the skid 3. It is essential that the rollers 103 and 104 move as frictionlessly as possible, and therefore these rollers are preferably provided with shoulder portions 103A and 104A. In addition, roller 103 is preferably secured by retainer nuts 106 and 107, and roller 104 may be secured by retaining nut 108 and another similar component not specifically depicted in FIG. 9.

As hereinbefore explained, it is the purpose of the hanger 55 to suspend the rigid member 46, and its associated components from the skid 3 of the helicopter 5. Accordingly, and as more particularly depicted in FIGS. 8 and 9, rigid member 46 is preferably provided with an upper T-like portion 46A, whereby the U-bracket 102 may be fixedly secured thereto by a pair of bolts 129 and lock nuts 130. In addition, hydraulic and electrical communication may be provided from the control source and hydraulic reservoir, as will hereinafter be explained through an appropriate hose 28 which enters through apperture 109 in the U-bracket 102, and which thereafter continues downwardly through the rigid member 46. In this respect, it should be noted that hanger assembly 55 is representative of other hanger assemblies 54 and 56 previously discussed with respect to FIG. 2.

Figure 10:
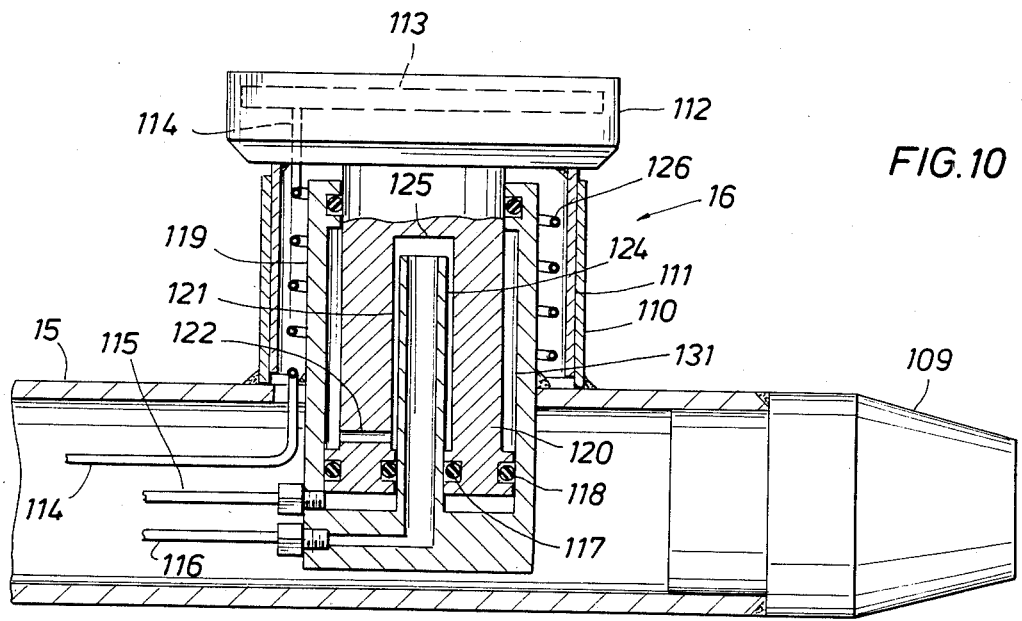
FIG. 10 is a simplified pictorial representation, partly in cross section of another further portion of the apparatus depicted in FIG. 1.

Referring now to FIG. 10, it may be seen a simplified pictorial representation, partly in cross section, of the basic details of the end of the inner sleeve 15 and the jack assembly 16 interconnected therewith. More particularly, it may be seen that the inner sleeve is stoppered at its far end by means of an appropriate end fitting 109, and that at suitable outer sleeve 110 is slidably interconnected with an inner sleeve 111, as will hereinafter be explained. Referring more particularly to the jack assembly 16, this component may be seen to be composed of a foot member 112 adapted to engage the under surface of the chassis of the motor vehicle 6, and preferably containing a solenoid 113 whereby the foot member 112 can be magnetized for non-slipping engagement with the chassis.

Referring again to FIG. 10, it may be seen that the foot member 112 is fixedly attached to the upper end of the sleeve 111, and is interconnected with a piston 120 having a central passageway 123 and a pair of bearing assemblies 117 and 118 adjacent its lower end. In addition, it will be noted that the foot member 112 is preferably supported within the outer sleeve 110 by a coiled spring 126 disposed about the exterior of a hydraulic cylinder 119 which is fixedly mounted at right angles to the inner sleeve 15, and which is further actuated and controlled by hydraulic pressure through lines 115 and 116. In this respect, it will be noted that hydraulic lines 115 and 116 are delivered to this apparatus through a conduit (not depicted) which also contains electrical lead 114 supplying power to the solenoid 113 in the foot member 112. Accordingly, the principle purpose of the telescoping assembly composed of the inner sleeve 111 and outer sleeve 110 is primarily to shield and protect the coiled spring 126 and electrical lead 114.

Referring again to FIG. 10, it may be seen that the foot member 112 will be extended upwardly to engage the chassis of the targeted vehicle 6 whenever hydraulic pressure is applied through hydraulic line 115 and below the lower surface of the piston 120. In this configuration, hydraulic return is provided by the path communicating through hydraulic line 116 and through the interior of the inner sleeve 124 to the space 125 and annular space 123. In addition, passage 122 is provided for intercommunication between the annular apperture 131 and space 123, to permit the piston 121 to rise through the cylinder 113. The piston 121 can be retracted through the cylinder 119, by routing pressure to line 116, and connecting line 115 as the return side of this assembly. In such a configuration, pressure will enter through line 116 and space 125, and will thereafter pass through annular space 123 and passage 122 to reach the annular apperture 131. This, in turn, drives the piston 121 downwardly through the cylinder 119, and hydraulic line 115 thereafter provides a return for the pressure created at the bottom of the piston 121.

As hereinbefore explained with respect to the structure depicted generally in FIG. 1, the carrying assembly 2 is preferably provided with four similarly constructed vertical support members 7, 17, 22 and 26, which are also preferably extendable or retractable to accomodate to the particular dimensions of the motor vehicle 6 sought to be seized and lifted. This extension and retraction capability is exemplified by the structure more specifically depicted in FIGS. 11 and 12, wherein the vertical support member 7 may be seen to include an outer sleeve 8 fixedly connected at its upper end to L-section 12 and slidably interconnected at its lower end with inner sleeve 9. More particularly, outer sleeve 8 may be seen to contain a suitable spider bracket 132 for permitting conduits 132 and 134 to pass into the inner sleeve 9, and for supporting a suitable eye bracket 142. Similarly, the inner sleeve 9 may be seen to contain a similar spider bracket 133 or the like also for passing conduits 132 and 134, and also for supporting a suitable eye bracket 147.

Referring again to FIGS. 11 and 12, it may be seen that a suitable hydraulic cylinder 140 is included having a clevis bracket 141 interconnected with the eye bracket 152 by pin 143, and further containing a suitable piston 144 extendable by pressure on one side from hydraulic line 155, and retractable by on the other side from hydraulic line 156 through passage 158. The piston 114 is suitably connected to one end of the piston rod 145 which has its opposite end connected to a clevis bracket 146 coupled to eye bracket 147 by pin 148. Accordingly, when hydraulic pressure is supplied to the interior of the cylinder 140 through hydraulic line 155, the other hydraulic line 156 is preferably routed through appropriate valving to become a "return," and the piston 144 and rod 145 will effectively drive inner sleeve 9 out of outer sleeve 8. Alternatively, when hydraulic pressure is routed through line 156 and line 155 is routed to "return," the inner sleeve 9 will be retracted into the outer sleeve 8.

Referring again to FIGS. 11 and 12, it will be apparent that if the carrying assembly 2 depicted in FIG. 1 engages and actually lifts the motor vehicle 6, the component within its vertical support member 7 which actually bears the weight of the vehicle 6 is the cylinder 140 and the piston 144 and rod 145. Although it is conceivable to immobilize the piston rod 145 within the cylinder 140 by trapping hydraulic pressure equally on both sides of the piston 144, it is not desirable to employ hydraulic pressure to support the vehicle 6. Accordingly, a latching assembly for mechanically supporting the vehicle 6 may be provided which includes an outer latching sleeve 152 fixedly connected to the spider 133 and extending about the rod 145, and an inner latching sleeve 149 having an array of spaced-apart fingers 150 each having a slip 151 at one end.

It is the purpose of the inner latching sleeve 149 to be movable whereby its slips 151 are brought into wedging engagement between the inside surface of the outer latching sleeve 152 and the flared end 140B, whenever the main outer sleeve 8 is moved upwardly and away from the main inner sleeve 9, as by lifting the vehicle 6 as hereinbefore described. After the slips 151 have been firmly seated, any further tension along the vertical support member 7 will no longer be felt by the piston rod 145, but instead will simply wedge the slips 151 more firmly and immovably between the inner latching sleeve 149 and the flared end 140B of the cylinder 140.

This latching mechanism is easily disengaged by merely applying hydraulic pressure through line 154 to the space 153 formed between the end of the inner latching sleeve 149 and the adjacent end of the thicker wall portion 140A of the cylinder 140. This drives the inner latching sleeve 149 toward the spider bracket 132, thereby compressing the coiled spring 157 disposed about the adjacent end of the cylinder 140 at the same time it draws the slips 151 from between the flared end 140B of the cylinder 140 and the inside surface of the outer latching sleeve 152. Prior to this step, the hydraulic line 154 will preferably have been routed to evacuate the space 153 during the latching step, as by interconnection with one or the other of lines 155-159.

Referring again to the structures depicted in FIG. 1, it should be noted that the carrying assembly 2 is preferably a basically self-contained unit having its own hydraulic fluid reservoir 160 and pump disposed across longitudinal members 48 and 51. In addition, a control unit 162 containing electrically actuated valves may also be disposed on the two longitidunal members 48 and 51, and interconnected by a cable 163 to suitable switches contained or disposed within the helicopter 5.

As hereinbefore explained, the various components of the carrying assembly 2 may be selectively actuated or positioned by hydraulic pressure routed to these components by a suitable arrangement of solenoid-actuated valves and the like. The various valves may be selectively actuated by electric switches in the control unit 162, and the valves themselves may either be located within the control unit 162, or they may be located to be a part of the pump 161 and reservoir 160.

Figure 13:
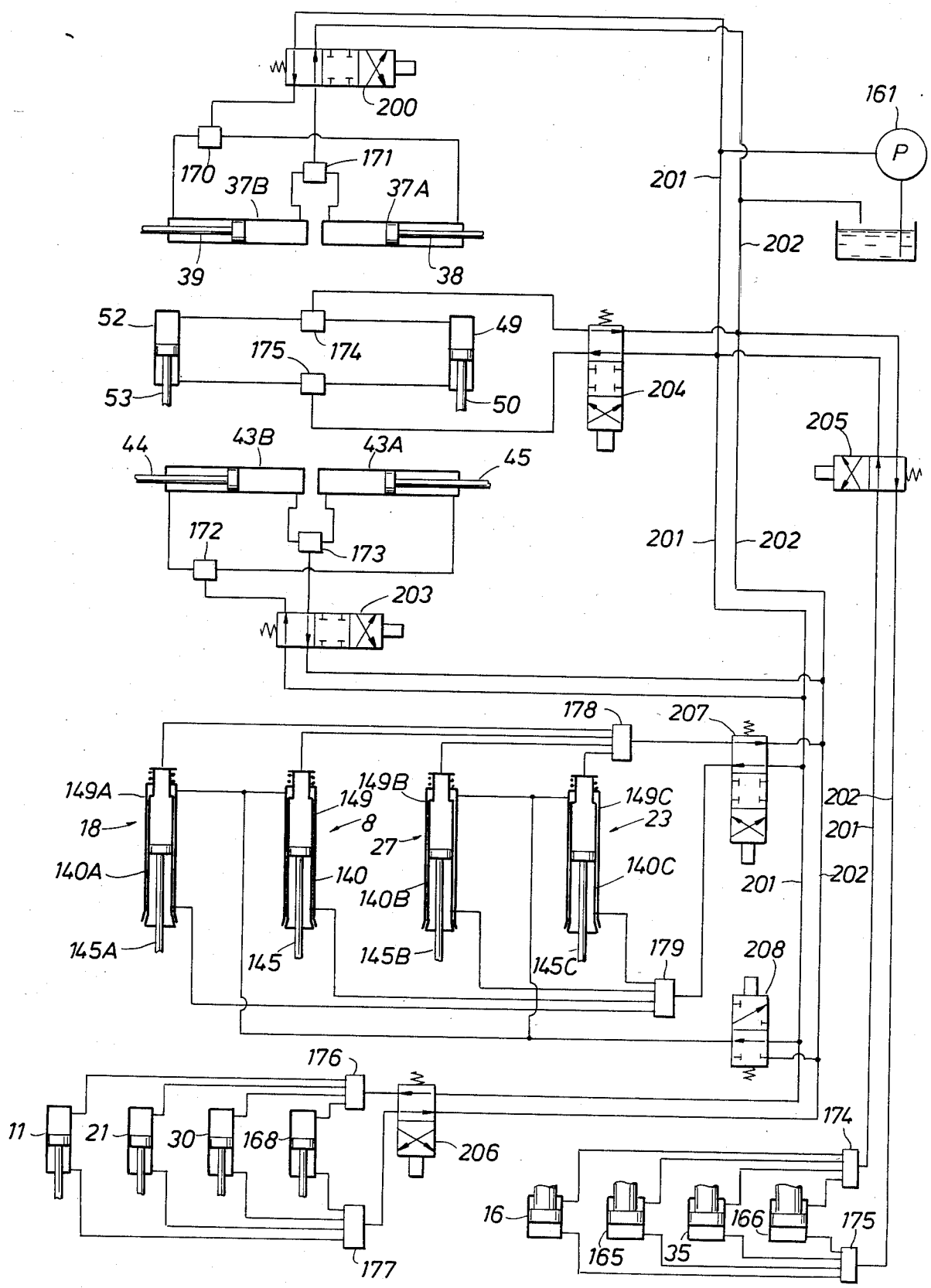
FIG. 13 is a simplified functional diagram of an electrically controlled hydraulic system for activating and operating apparatus of the type depicted generally in FIG. 1.

Referring now to FIG. 13, there may be seen a simplified functional representation of these valves and hydraulic lines, including a functional representation of the reservoir 160 and pump 161 interconnected with a pair of spring-loaded, solenoid-actuated valves 200 and 203 by a pressure line 201 and a return line 202. The purpose of valves 200 and 203 is to route hydraulic pressure so as to simulltaneously and synchronously retract pistons 38-39 within the double cylinder assembly 37, and also pistons 44-45 within the double cylinder assembly 43, so as to bring the vertical support assemblies 7, 17, 22 and 26 into close proximity to the sides of the vehicle 6. The two double cyclinder assemblies 37 and 43 are each composed of two separate cylinders 37A-B and 43A-B respectively, it will be apparent that pressure must be applied equally to drive these pistons.

The purpose of valve 200 is to cause pistons 38 and 39 to extend or retract according to the width of the vehicle 6 sought to be engaged by the carrying assemble 2. Accordingly, valve 200 is preferably of a type whereby it can be selectively adjusted, by an appropriate signal from the control unit 162, to move or assume one of three different conditions or positions within the system. When the valve 200 is in the position illustrated in FIG. 13, hydraulic pressure is routed through the valve 200 to a suitable distributor 170 which, in turn, delivers the pressure equally to pistons 38 and 39. In this manner, piston 38 will be driven into cylinder 37A under the same pressure and to the same extent that piston 39 is driven into cylinder 37B.

Alternatively, if it is desired to separate vertical support member 7 from vertical support member 17 then valve 200 may be moved or shifted in response to a suitable signal from the control unit 162, a second position wherein hydraulic pressure from line 201 is transfered from distributor 170 to the distributor 171. In this second posture of valve 200, hydraulic pressure is routed equally to the two cylinders 37A-B within the cylinder assembly 37, and hydraulic return is shifted from the second distributor 171 to the first distributor 17, whereby pressure within the cylinders 37A-B will extend pistons 38-39.

It will be apparent that, whenever valve 200 is in either of these first two positions, the pistons 30-39 will necessarily be extended or retracted to the full extent permitted by their structural design. As hereinbefore explained, however, what is needed for present purposes is the capability of selectively extending the pistons 38-39 only limited distances within the cylinders 37A-B. Accordingly, it is desired that valve 200 be adapted or designed to have a third condition or position whereby hydraulic pressure can be trapped in the cylinders 37A-B whenever the pistons 38-39 are extended or retracted to accomodate the configuration of the particular vehicle sought to be seized and lifted.

As hereinbefore noted, it is preferable that pistons 38-39 be extended and retracted simultaneously and synchronously with pistons 44-45 in the opposite ends of the two cylinders 43A-B which compose the cylinder assembly 43 illustrated in FIG. 1. Accordingly a similar solenoid-actuated valve 203, which also may conveniently be electrically operated by the control unit 162, may in one position route pressure from line 201 to a third distributor 172 which, in turn, delivers such pressure equally to retract pistons 45-45 within cylinders 43A-B respectively. It is preferable that vertical support members 22 and 26 be moved to and from each other in synchronism with vertical support members 7 and 17, and that valves 200 and 203 both be similarly positioned in synchronism with each other. Accordingly, if valve 203 is changed to its alternate position by a suitable signa from the control unit 162, hydraulic pressure will then be shifted to the other distributor 173 which, in turn, routed pressure equally to cylinders 43A-B. The return line 202 will now be interconnected through the distributor 172 to pistons 44-45, and therefore pistons 44-45 will be extended from the opposite ends of cylinders assembly 43 in synchronism with pistons 38-39. Similarly, if valve 203 is moved or adjusted to its third "neutral" position, hydraulic pressure in the cylinders 43A-B will trap and immobilize pistons 44-45.

It will be apparent that, in the arrangement illustrated in FIG. 13, valves 200 and 203 are intended to be actuated and positioned simultaneously and in synchronism with each other, and that both valves 200 and 203 may, therefore, be conveniently operated by the same electrical signals from the control unit 162. If it is desired that valve 200 be capable of being operated independently of valve 203, however, this may easily and conveniently be achieved by providing for separate signals to be generated by or in the control unit 162.

Referring back to FIG. 13, it will be noted that lines 201-202 are also connected to another solenoid-actuated hydraulic valve 204 which, in turn, is interconnected with another pair of distributors 174 and 175. This valve 204, which is preferably similar to valves 200 and 203, functions to couple hydraulic pressure through distributor 175 to cylinders 49 and 52, and to couple the return from these two components through distributor 174, when the valve 204 is in the position indicated in FIG. 13. In this posture, pistons 50 and 53 will be retracted into cylinders 49 and 52, and vertical support members 7 and 17 will be drawn toward vertical support members 26 and 22, respectively. Alternatively, when valve 204 is shifted to its alternative position or state, and pressure is shifted from distributor 175 to distributor 174, the pistons 50 and 53 will simultaneously and synchronously be extended from cylinders 49 and 52, respectively, to move vertical support members 7 and 17 away from vertical support members 26 and 22, respectively.

It will be apparent, of course, that it may be desirable to position vertical support members 7 and 17 only a selected limited distance away from vertical support members 22 and 26. In such a case, it is clearly necessary that valve 204 be a three-position or three state valve, the same as valves 200 and 203.

Referring again to FIG. 13, there may be seen a simplified representation of another similar solenoid-actuated valve 205, which may appropriately have two alternative positions, and which may also be conveniently controlled or energized by a signal from the control unit 162 in the helicopter 5. As indicated in FIG. 13, when the valve 205 is in one position, hydraulic pressure is routed to another distributor 174 which, in turn, delivers the pressure equally to the two jack assemblies 16 and 35 depicted in FIG. 1, and also equally to the other two jack assemblies 165-166 not visible in FIG. 1, to retract all four piston members simultaneously and synchronously with each other. If the valve 205 is changed to its second alternative position by a suitable signal from the control unit 162, then hydraulic pressure will be shifted to the other distributor 175 to extend all four pistons and return to the reservoir 160 is effected through the first distributor 174.

It is usually convenient for present purposes to either fully extend, or to fully retract, the pistons in the four jack assemblies 16, 34, and 165-166, and this is why valve 205 is depicted in FIG. 13 as having only two alternative positions or states in the system. However, it may sometimes be convenient for valve 205 to be similar in configuration to valves 200 and 203, whereby these pistons can be selectively extended or retracted as hereinbefore explained.

As hereinbefore noted, the jack assemblies 16, 34 and 165–166 may conveniently be acurately moved in and out from beneath the vehicle 6 by rotating sections 11, 21 and 30 depicted in FIG. 1, and by a fourth rotating section 11, 21, 30 and 168 may conveniently be achieved by another solenoid actuated valve 206 which, when in the position illustrated in FIG. 3, delivers hydraulic pressure from line 201 to a first distributor 176 and interconnects a second distributor 177 to the return line 202 leading to the reservoir 160. The first distributor 176 functions to deliver hydraulic pressure equally to the rotating sections 11, 21, 30 and 168 to extend their respective pistons as indicated more particularly in FIGS. 6 and 7, and to thereby swing the four jack assemblies out from under the vehicle 6. However, if the valve 206 is changed to its alternative position by a suitable signal from the control unit 162, then hydraulic pressure will be applied through the second distributor 177, to retract the pistons, and to connect the first distributor 176 to the reservoir 160 by means of the return line 202. Retraction of these four pistons will, of course, swing the four jack assemblies into position beneath the vehicle 6, all as hereinbefore explained.

It will be apparent that, in most instances, the four jack assemblies 16, 35 and 165–166 will either be fully rotated under or away from beneath the vehicle 6. Accordingly, this is why valve 206 need only have two alternative positions instead of three as in the case of valves 200 and 203. In the case of valve 204, however, it will be apparent that this component should preferably be provided with three alternative conditions or positions as suggested in FIG. 13.

Referring again to FIG. 1, it will be recalled that the carrying assembly 2 includes four vertical support members 7, 17, 22 and 26 each of which includes a telescopically interconnected pair of outer and inner sleeves 8–9, 18–19, 27–28 and 23–24 for extension or retraction to selectively accomodate vehicles of different dimensions. Each of these components are the same in configuration and operation, as previously explained in regard to the apparatus more specifically depicted in FIG. 11.

Referring again to FIG. 13, there may be seen a simplified functional representation of the basic components within the sleeves 8–9, including the rod 145, cylinder 149 and inner latching sleeve 140 depicted in FIG. 11, and further including the structures suitable for actuating these components. More specifically, there may be seen a suitable solenoid-actuated valve 207 having two alternative positions as determined by appropriate signals from the control unit 162 and interconnected with the pressure and return lines 201-202 leading to the pump 161 and reservoir 160. In particular, when the valve 207 is in the position suggested or indicated in FIG. 13, hydraulic pressure is applied to a first distributor 179 which, in turn, routes such pressure to the interior of the latching sleeve 140 to extend the piston rod 145. Similarly, pressure is equally delivered to the latching sleeves 140A–C in sleeves 18, 27 and 23, to extend their respective piston rods 145A–C. Alternatively, when the valve 207 is in its other position, hydraulic pressure is applied to another distributor 178 which routes such pressure equally to the interiors of the cylinders 149 and 149A–C, whereby the latching sleeves 140 and 140A–C become wedged into locking position as hereinbefore described.

Referring again to FIG. 13, there may be seen another solenoid-actuated valve 208 also having two alternate positions. In this case, however, the valve 208 functions to route hydraulic pressure to the interiors of the cylinders 149 and 149A–C, to unlatch these mechanisms by extending the latching sleeves 140 and 140A–C, when the valve 208 is in the position indicated in FIG. 13. When the valve 208 is in its alternative position, however, the spaces between the cylinders 149 and 149A–C, and the latching sleeves 140 and 140A–C respectively, are opened to the return line 202.

Many other modifications and adaptions may, of course, be made without departing from the concept of the present invention. Accordingly, it should clearly be understood that the structures and techniques hereinbefore described and depicted, are illustrative only, and are not intended as limitations on the scope of the invention.

What is claimed is:

1. Apparatus for seizing and lifting a motor vehicle and the like, comprising
   a first plurality of spaced-apart extensible frame members,
   a second plurality of spaced-apart extensible frame members each interconnected across adjacent ends of said first extensible frame members,
   a plurality of first suspension members each interconnected at one end of a selected one of said second plurality of frame members and each adapted at the other end to movably interconnect with the skid of a helicopter and the like,
   a plurality of second suspension members each interconnected with and selectively extensible from one of the ends of one of said second plurality of frame members to and about a portion of said vehicle,
   a plurality of hydraulically-actuated selectively extensible jacking means each disposed at the lower end of one of said second suspension members and being adapated to engage the chasis of the motor vehicle, and
   a plurality of rotating members each fixedly mounted on the lower end of one of said second suspension members for swinging the jacking means in and out from under the motor vehicle.

2. The apparatus described in claim 1, wherein said first plurality of extensible frame members comprises
   a pair of spaced-apart outer sleeve members alignable longitudinally of said vehicle,
   a pair of inner sleeve members each slidably disposed within adjacent ones of the ends of said outer sleeve members, and
   a pair of hydraulically-actuated drive mechanisms each disposed within one of said sleeve members for selectively moving its respective inner sleeve member.

3. The apparatus described in claim 2 further comprising a plurality of foot members each interconnected between the lower end of one of said second suspension members and a corresponding one of said jacking means.

4. The apparatus described in claim 3 wherein each of said rotating members is disposed at right angles of the corresponding one of said foot members.

5. The apparatus described in claim 4, wherein each of said rotating members is arranged and adapted to accurately revolve its corresponding foot member within a plane substantially perpendicular of the longitudinal axis of the second suspension member to which said rotating member is affixed.

6. The apparatus described in claim 5, wherein each of said rotating members is further arranged and adapted to revolve said corresponding foot member through an angle of substantially 90 degrees within said perpendicular plane.

7. The apparatus described in claim 6, wherein each of said foot members is longitudinally extendable and retractable within said plane and from and to said lower end of the corresponding one of said second suspension member.

8. The apparatus described in claim 7, further including
   a source of hydraulic pressure,
   a control unit interconnected with said pressure source for providing electrical control signals,
   a first hydraulic valve means responsive to said control signals for extending and retracting said first plurality of extensible frame members,
   a second hydraulic valve means responsive to said control signals for extending and retracting said second plurality of extensible frame members, and
   a third hydraulic valve means responsive to said control signals for extending and retracting said second suspension members.

9. Apparatus as described in claim 9, further comprising a fourth hydraulic valve means responsive to said control signals for extending and retracting said second suspension members.

10. Apparatus for seizing and lifting a motor vehicle and the like, comprising
    a first plurality of spaced-apart extensible frame members,
    a second plurality of spaced-apart extensible frame members each interconnected across adjacent ends of said first extensible frame members,
    a plurality of first suspension members each interconnected at one end of a selected one of said second plurality of frame members and each adapted at the other end to movably interconnect with the skid of a helicopter and the like,
    a plurality of second suspension members each interconnected with and selectively extensible from one of the ends of one of said second plurality of frame members to and about a portion of said vehicle,
    a plurality of hydraulically-actuated selectively extensible jacking means each disposed at the lower end of one of said second suspension members and being adapted to engage the chasis of the motor vehicle,
    a plurality of rotating members each fixedly mounted on the lower end of one of said second suspension members for swinging the jacking means in and out from under the motor vehicle, and
    a plurality of hydraulically-actuated selectively extensible foot members each interconnected between the lower end of one of said second suspension members and a corresponding one of said jacking means.

11. Apparatus for seizing and lifting a motor vehicle and the like, comprising a first plurality of spaced-apart extensible frame members, a second plurality of spaced-apart extensible frame members each interconnected across adjacent ends of said first extensible frame members, a plurality of first suspension members each interconnected at one end of a selected one of said second plurality of frame members and each adapted at the other end to movably interconnect with the skid of a helicopter and the like, a plurality of second suspension members of each interconnected with and selectively extensible from one of the ends of one of said second plurality of frame members to and about a portion of said vehicle, a plurality of hydraulically-actuated selectively extensible jacking means each disposed at the lower end of one of said second suspension members and being adapted to engage the chasis of the motor vehicle, a plurality of rotating members each fixedly mounted on the lower end of one of said second suspension members for swinging the jacking means in and out from under the motor vehicle, said first plurality of extensible frame members being a pair of spaced-apart outer sleeve members alignable longitudinally of said vehicle, a pair of inner sleeve members each slidably disposed within adjacent ones of the ends of said outer sleeve members, a pair of hydraulically-actuated drive mechanisms each disposed within one of said sleeve members for selectively moving its respective inner sleeve member, a plurality of foot members each interconnected between the lower end of one of said second suspension members and a corresponding one of said jacking means, each of said rotating members being disposed at right angles of the corresponding one of said foot members, each of said rotating members being arranged and adapted to accurately revolve its corresponding foot member within a plane substantially perpendicular of the longitudinal axis of the second suspension member to which said rotating member is affixed, each of said rotating members being further arranged and adapted to revolve said corresponding foot member throughout an angle of substantially 90 degrees within said perpendicular plane, each of said foot members being longitudinally extendable and retractable within said plane and from and to said lower end of the corresponding one of said second suspension members, a source of hydraulic pressure, a control unit interconnected with said pressure source for providing electrical control signals, a first hydraulic valve means responsive to said control signals for extending and retracting said first plurality of extensible frame members, a second hydraulic valve means responsive to said control signals for extending and retracting said second plurality of extensible frame members, a third hydraulic valve means responsive to said control signals for extending and retracting said second suspension members, and a fourth hydraulic valve means responsive to said control signals for extending and retracting said second suspension members.

* * * * *